March 5, 1935.　　　　C. McMILLAN　　　　1,993,347
DRAFTING INSTRUMENT
Filed June 4, 1931　　　3 Sheets-Sheet 2
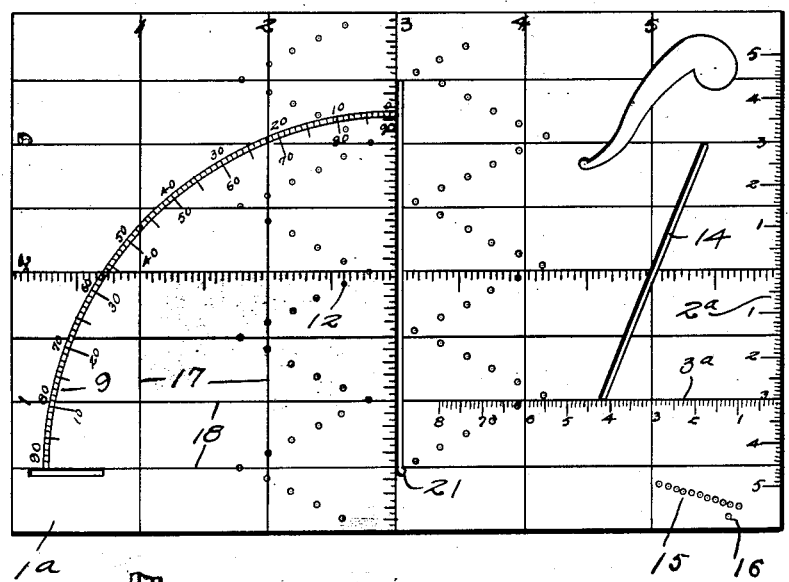

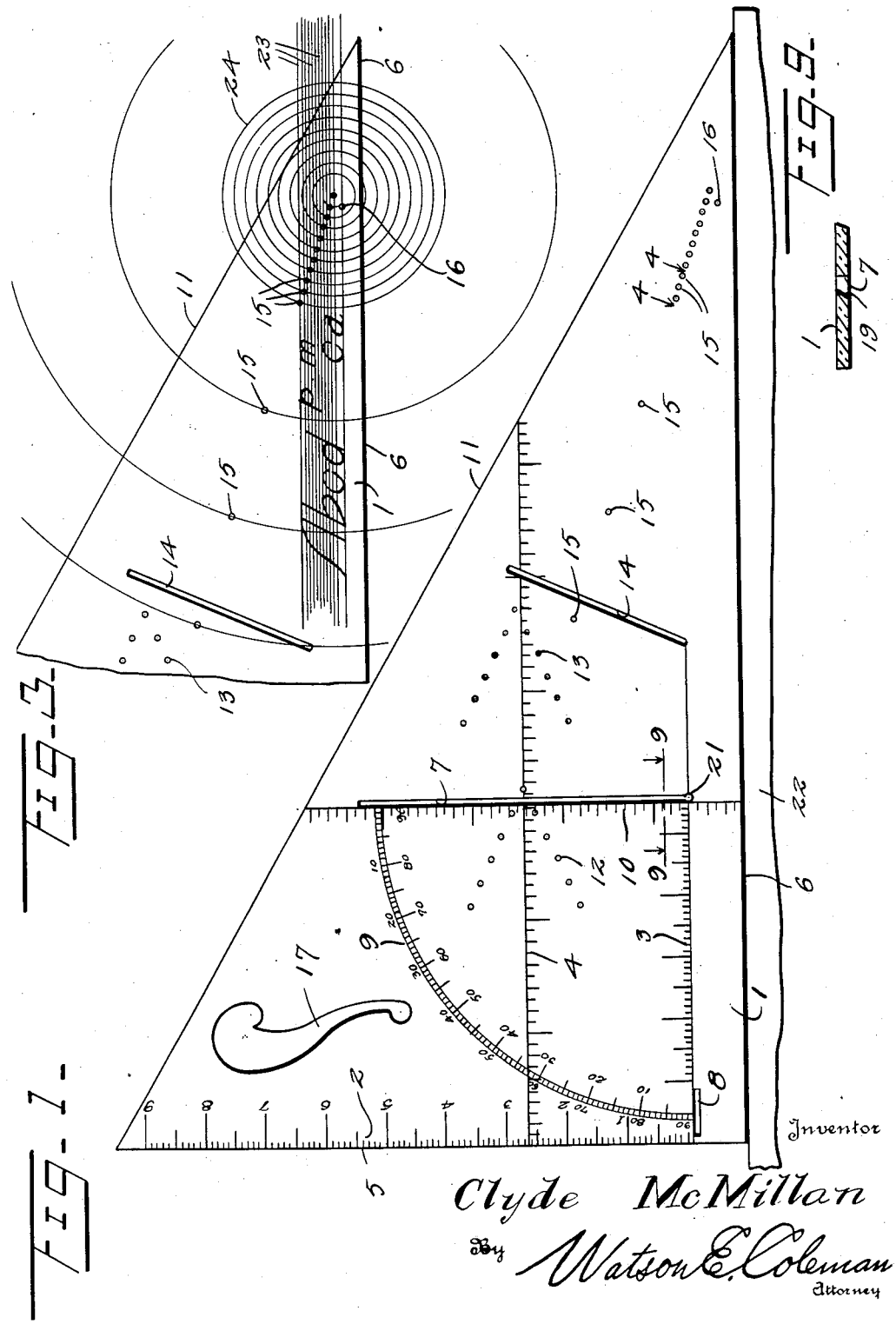

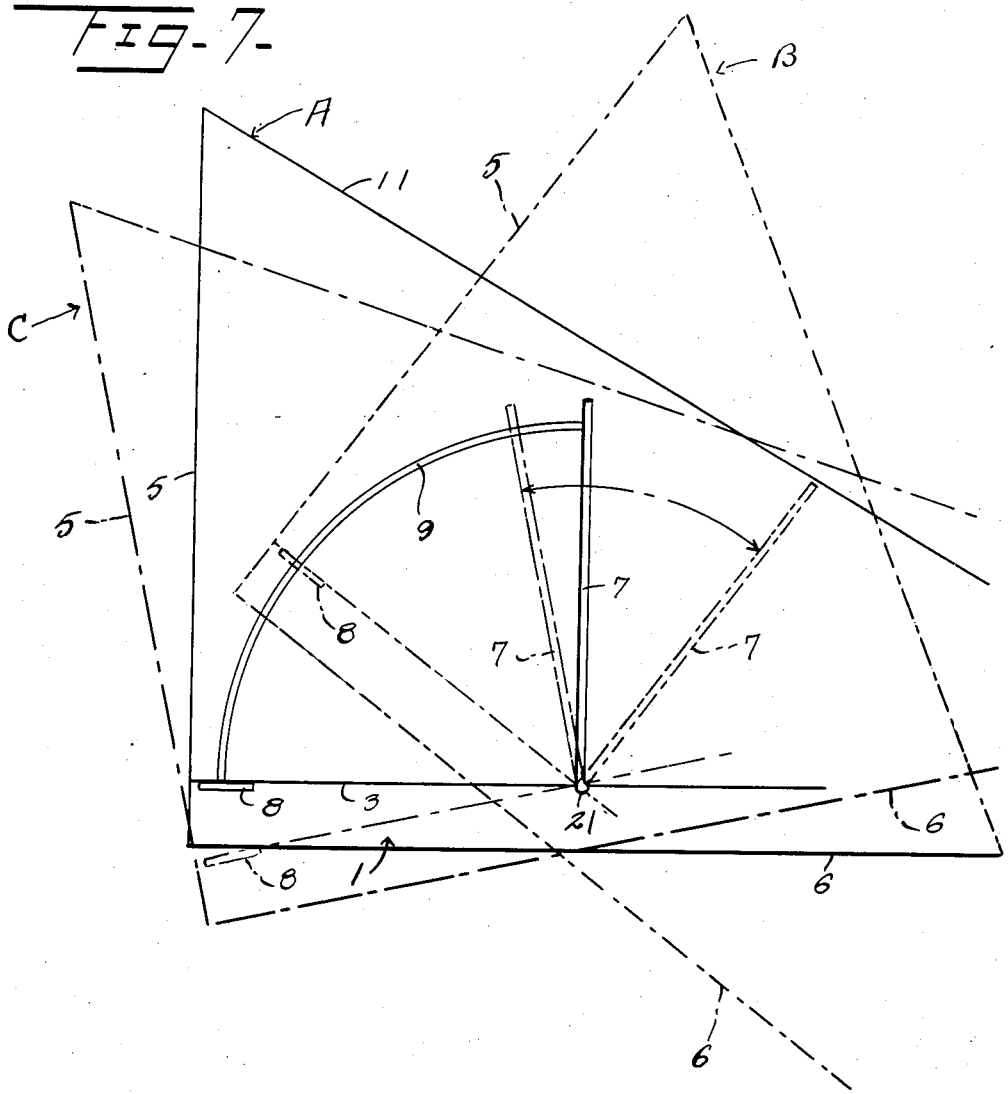

Patented Mar. 5, 1935

1,993,347

UNITED STATES PATENT OFFICE 1,993,347

DRAFTING INSTRUMENT

Clyde McMillan, Toledo, Oreg.

Application June 4, 1931, Serial No. 542,117

4 Claims. (Cl. 33—104)

This invention relates to drafting instruments, and has for one of its objects to provide an instrument of this character through the medium of which any desired slope or degree may be laid out without the aid of the usual separate protractor and in shorter time and with less effort.

The invention has for a further object to provide an instrument of the character stated through the medium of which parallel lines may be drawn to scale, through the medium of which circles or arcs of different radii may be drawn, and through the medium of which the bisecting perpendicular of a straight line may be drawn, without the aid of instruments now used for performing these operations and in shorter time and with less effort than required when using such instruments.

The invention has for a further object to provide a drafting instrument of the character stated through the medium of which vertical or inclined block letters and upper and lower case letters of any desired height and width may be drawn, and through the medium of which city blocks, streets, alleys and the like may be laid out, in shorter time and with greater ease than possible with the instruments now employed for these operations.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a plan view of a drafting instrument of triangular formation embodying my invention.

Figure 2 is a plan view of a drafting instrument of rectangular formation embodying my invention.

Figure 3 is a diagrammatic view illustrating the manner in which either instrument may be employed for the purpose of drawing circles or making upper and lower case letters.

Figure 4 is a sectional view taken on the plane indicated by the line 4—4 of Figure 1.

Figures 5, 6 and 8 are diagrammatic views illustrating the method of drafting letters with either instrument.

Figure 7 is a diagrammatic view illustrating the manner in which the instrument is employed to lay out slopes or degrees, and Figure 9 is a sectional view taken on the line 9—9 of Figure 1.

Referring in detail to the drawings, and particularly to Figures 1, 3 and 7, 1 designates a drafting instrument triangular in form. The instrument 1 may be made from transparent material such as celluloid or the like, and is provided with linear scales 2, 3 and 4, the divisions of which represent inches and fractions of inches. The scale 2 extends along the vertical edge 5 of the instrument 1, the scale 3 is located above and arranged in parallel relation to the horizontal edge 6 of the instrument, and the scale 4 is located above and parallel to the scale 3.

The instrument is provided with vertical and horizontal slots 7 and 8, respectively, and with a ninety degree protractor 9 extending from the vertical to the horizontal slot. A linear scale 10 arranged parallel to the slot 7 extends from the horizontal edge 6 to the hypotenuse edge 11 of the instrument, the graduations of the scale representing inches and fractions of inches. A series of openings 12 arranged in the form of a V and similar series of openings 13 are formed in the instrument 1, the series of openings 13 being located opposite the series of openings 12, and the openings of said second series being spaced further apart than said first series, the spacing of the openings of the respective series being such that the openings of one series are related in staggered relation to those of the others. A slot 14 is formed in the instrument 1, and is arranged at an angle of twenty-two and one-half degrees to the vertical slot 7. The instrument is provided with a straight series of openings 15 which incline upwardly from a point near the right hand corner of the instrument. The openings 12 and 13 are spaced at any desired or required distance apart. The openings 15 are more closely related near the lower end of the series than throughout the remainder of the series, and an opening 16 is located below and to the left of the lowermost of the openings 15. The openings 15 may be spaced at any desired or required distance apart. The instrument is also provided with a French curve 17.

The instrument as shown in Figure 2 and generally designated 1a, is similar to the instrument shown in Figures 1 and 3 with the exception that it is rectangular in plan, with the exception that it is provided with more than two V-shaped series of openings, and with the exception that it is provided with vertically and horizontally disposed lines 17 and 18, respectively, the vertical lines being spaced one inch apart, and the horizontal lines being spaced one-half of an inch apart. Those parts of the instrument that are similar to the instrument shown in Figures 1 and 3 are designated by similar reference characters.

One wall of each of the slots 7, 8 and 14 of both instruments is inclined, in order to take up the pencil point and thus permit a straight sharp line to be drawn, as illustrated in Figure 9, wherein the inclination of a wall of the slot 7 is shown and designated 19. The upper ends of the openings 12, 13 and 15 are enlarged, as shown at 20, in Figure 4, to the end that a pencil point may be readily directed through any of the openings. The lower end of the slot 7 of each instrument is rounded, as shown at 21, in Figures 1 and 2, for the reception of the point of a pencil when the pencil is used as a pivot for either instrument.

The manner in which the instrument may be used for the purpose of laying out a slope or degree is graphically illustrated in Figure 7. In laying out a slope or degree, the instrument is placed against a horizontally disposed straight edge, which is shown in Figure 1 and designated 22, and a vertical line is drawn by inserting the pencil point through the slot 7 and moving it along the inclined wall 19 of this slot. The instrument when in position to permit the drawing of the vertical line is shown by solid lines and designated A in Figure 7.

If the slope or degree is to be indicated by a line located to the right of the vertical line and arranged at forty-five degrees with respect thereto, the instrument is swung in a clockwise direction from its position A until the graduation 45 of the protractor 9 registers with the vertical line. The instrument is now in position B in which it is illustrated by broken lines in Figure 7, and it is swung into this position with the point of the pencil serving as a pivot and located in the rounded lower end 21 of the slot 7. After the instrument has been moved into this position the slope or degree line is drawn by moving the pencil point along the inclined wall 19 of the slot 7. If it is desired to lay out a triangle of, for instance, ten degrees, vertical and horizontal lines are drawn with the instrument in position A, the vertical line being drawn by moving the pencil against the inclined wall of the slot 7, and the horizontal line being drawn by moving the pencil along the inclined wall of the slot 8. Thereafter the instrument is swung in a counter-clockwise direction from this position to the position C in which it is shown by broken lines in Figure 7 until the ten degree graduation of the protractor 9 registers with the horizontal line, the instrument being swung with the point of the pencil used as a pivot and located in the lower end of the slot 7. After the instrument has been moved into this position the inclined line of the angle is drawn by moving the pencil along the inclined edge of the slot 7. The openings 12 and 13 may be used for the purpose of drawing parallel lines to scale, and the openings 15 may also be used for this purpose, as graphically illustrated in Figure 3. These lines 23 may be used as guides in forming upper and lower case letters, as shown in this figure.

The openings 15 may be used for the purpose of drawing circles, as also shown in Figure 3, wherein the circles are designated 24. When used for this purpose a pencil point or thumb tack is passed through the opening 16 and engaged with the paper on which the circles are to be drawn, the instrument is swung about the pencil point or thumb tack as a center with the pencil in one of the openings 15, the opening through which the scribing pencil point passes depending on the diameter of the circle to be drawn.

As shown in Figures 5, 6 and 8 the instrument may be used for the purpose of forming vertical or inclined block letters, the horizontally disposed letter forming guide lines 25 being drawn with the pencil passing through certain of the openings 12, 13 or 15, the vertically disposed guide lines 26 being formed by moving the pencil along the inclined wall of the slot 7, and the inclined guide lines 27 being formed by moving the pencil point along the inclined wall of the slot 14. In forming the guide lines 23, 25 and 26 the instrument is used in connection with the straight edge and moved along the same, and when forming the guide lines 27 the instrument is held against movement. The lines 17 and 18 of the instrument 1a enable oblong and square designs to be readily drafted and also enable city blocks, streets and alleys to be readily laid out. If desired the instrument 1 may be provided with these lines.

From the foregoing description, taken in connection with the accompanying drawings, it will be apparent that each of the instruments constitutes a plotter, protractor, compass and section liner, that each has three linear scales and provides for the forming of vertically and angularly disposed letters and for the forming of irregular curves, the slot 17 being used for the formation of the curves.

While I have described the principle of the invention, together with the structure which I now consider the preferred embodiment thereof, it is to be understood that the sructure shown is merely illustrative and that such changes may be made, when desired, as fall within the scope of the invention as claimed.

What is claimed is:—

1. A drafting instrument of transparent sheet material having a straight edge and scale extending parallel to the straight edge, and a slot at right angles to the scale and intersecting the scale intermediate its ends, a protractor scale extending concentrically to one end of the slot and at one end intersecting said slot inward of the adjacent end of the slot and intermediate its other end intersecting said scale, and a slot at right angles to the first named slot and on a line intersecting that end of the first named slot which forms a pivotal center for the protractor.

2. A drafting instrument of transparent sheet material having a straight edge and a scale extending parallel to the straight edge, and a slot at right angles to the scale and at one end intersecting the scale, a protractor scale extending concentrically to one end of the slot and at one end intersecting said slot inward of the adjacent end of the slot and at its other end intersecting said first named scale, and a scale extending parallel to the first named scale and intersecting the first named slot midway of its length and intersecting the protractor.

3. A drafting instrument of transparent sheet material having a straight edge and a scale extending parallel to the straight edge, and a slot at right angles to the scale and at one end intersecting the scale, a protractor scale extending concentrically to one end of the slot and at one end intersecting said slot inward of the adjacent end of the slot and at its other end intersecting said scale, and a scale extending parallel to the first named scale and intersecting the first named slot midway of its length and intersecting the protractor, and a slot extending at an angle of approximately twenty degrees to the first named slot and spaced therefrom and extending through and beyond the last named scale.

4. A drafting instrument of transparent sheet material having a scale extending in one direction and longitudinally of the instrument, a slot extending at right angles to the scale and intersecting this scale intermediate the ends of the scale, a protractor scale extending concentrically to one end of the slot and at one end intersecting said slot inward of the adjacent end of the slot and also intersecting said scale, a slot at right angles to the first named slot and intersecting one end of the protractor scale and on a line intersecting that end of the first named slot which forms a pivotal center for the protractor, a scale extending parallel to the first named slot, the instrument having pencil-point-admitting perforations co-ordinating with the graduations on the first and second named scales and arranged in zig-zag lines.

CLYDE McMILLAN.